July 2, 1940.  I. J. CLARK  2,206,631
REFRIGERATION
Filed Feb. 1, 1939  2 Sheets-Sheet 1
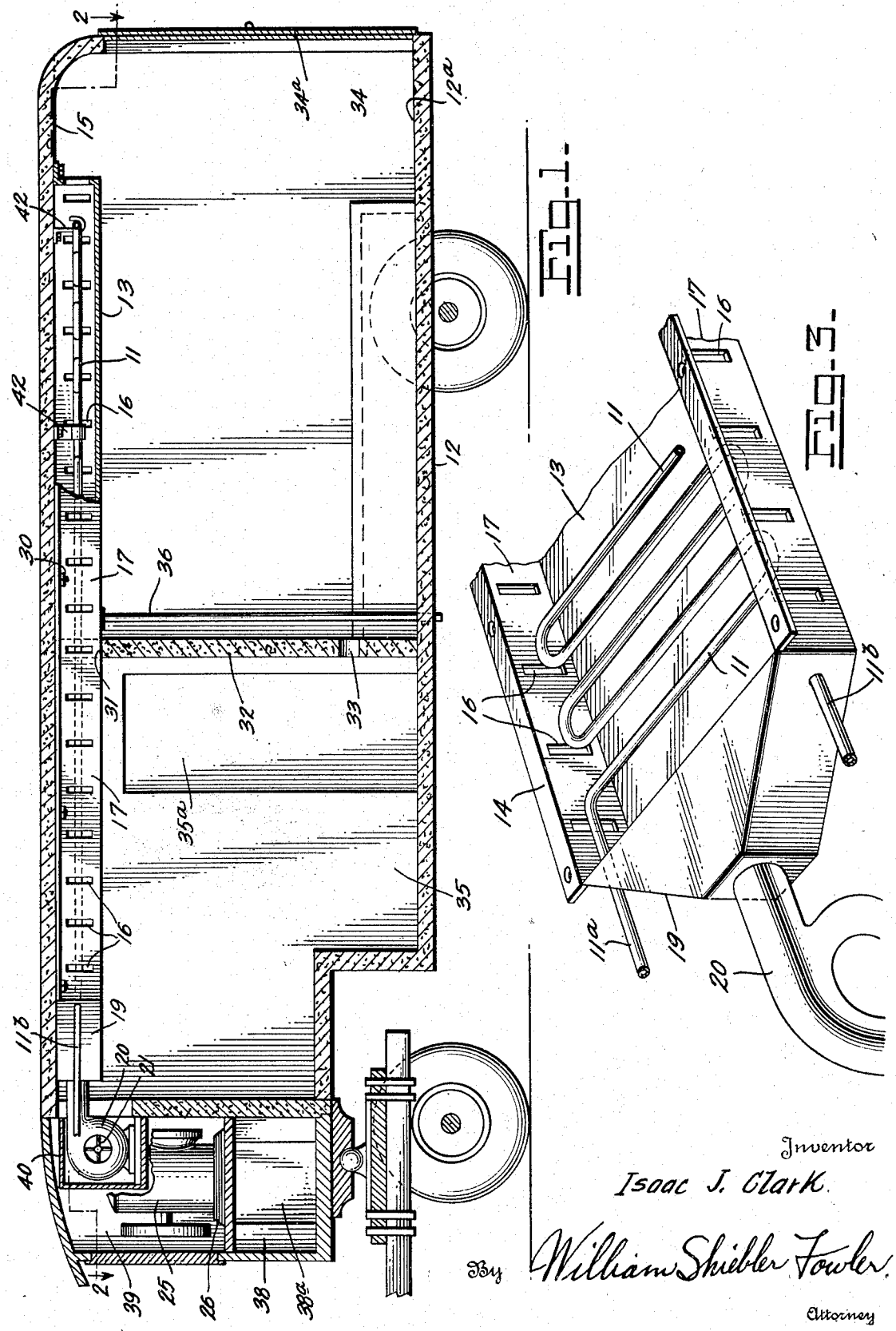
Inventor
Isaac J. Clark.
By William Shiebler Fowler.
Attorney

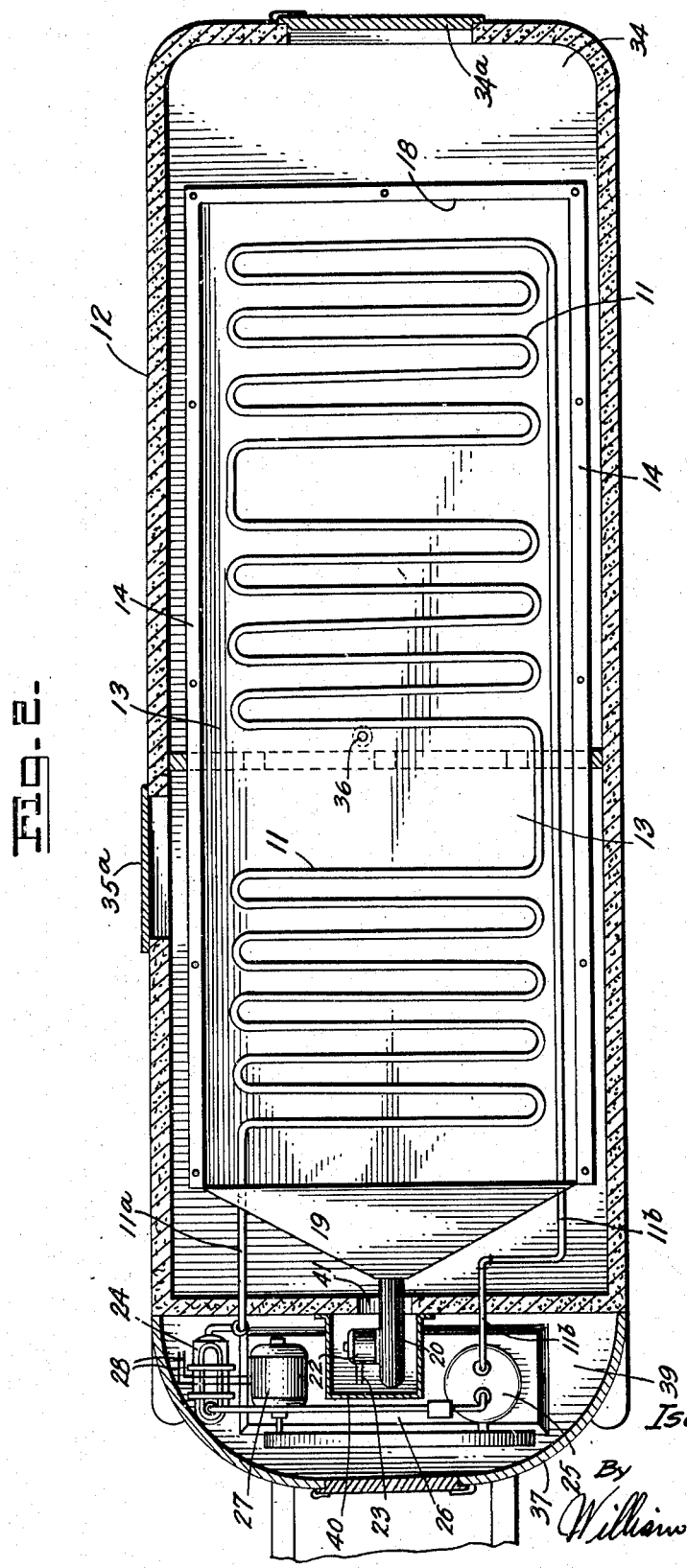

Patented July 2, 1940

2,206,631

UNITED STATES PATENT OFFICE 2,206,631

REFRIGERATION

Isaac J. Clark, Washington, D. C.

Application February 1, 1939, Serial No. 254,091

2 Claims. (Cl. 62—102)

This invention relates to certain new and useful improvements in refrigeration and has for its primary object the provision of an insulated structure in which a predetermined temperature may be attained and maintained as desired, for the preservation of food or other products therein, in a clean, sanitary and wholesome condition, for unlimited periods of time, during transportation or storage thereof.

Another object of the invention resides in the provision of an insulated structure of the character stated in which there is a controlled constant circulation of air at the predetermined temperature, in every part of the structure, above, beneath and all around each and every product therein.

A further object of the invention resides in the provision of an insulated structure of the character stated which will assure complete successful preservation of the contents thereof, in all climates and under all conditions, during all seasons of the year and regardless of the conditions surrounding the insulated structure.

The invention has for a still further object, the provision of an insulated structure for refrigeration purposes which is compact and relatively inexpensive and light in weight and equally efficient either as a stationary structure or as a travelling structure.

A still further object of the invention resides in the provision of simple and inexpensive means for causing and controlling constant circulation of air at a predetermined temperature and other important and novel features of structure which are particularly designed for and adapted to the type of refrigeration structure disclosed in U. S. Patent No. 1,966,164 and U. S. Design Patent No. 96,817, both of which were granted to I. J. Clark, but which new features of structure may be equally adapted to other types of refrigeration, etc.

Other objects of the invention will appear in the following detailed description, taken in connection with the accompanying drawings forming a part of this application and in which drawings:

Figure 1 is a vertical longitudinal section through a refrigeration structure having embodied therein the features of improvement constituting the present invention.

Figure 2 is horizontal longitudinal section thereof, taken on the plane of line 2—2 of Figure 1, looking in the direction indicated by the arrows.

Figure 3 is an enlarged perspective of the means for causing and controlling constant circulation of air at a predetermined temperature, a portion of this structure being broken away.

Referring more particularly to the drawings, wherein like characters indicate like and corresponding parts throughout the several views, it is to be noted that refrigeration coils 11 are provided in the upper portion of an insulated refrigeration structure 12, close to the ceiling thereof.

The insulated refrigeration structure 12 may be of the type and construction disclosed in the patents mentioned above or of any other appropriate type and construction. A protecting pan 13 for the refrigeration coils 11 is secured in an appropriate manner by its edges 14, to the ceiling 15, for protection of the coils 11 and this protecting pan has slots 16 in its sides 17, while its ends 18 and 19 are completely closed, the end 19 being funnel shaped and having connected to its smaller portion an air pipe 20 extended from a blower fan 21, suitably located and operated from any appropriate source of power, such as the motor 22 having current conducting wires 23 connected therewith.

While the refrigeration coils 11 are shown as extending transversely from one end of the tray 13, to the other end thereof and the ends 11a and 11b of the refrigeration coils 11 extending through the funnel shaped end 19 of the protecting pan 13, this may be altered as desired, just so the ends 11a and 11b of the refrigeration coil 11 connect respectively with the freezing tank 24 and the compressor 25 of a refrigeration unit 26 having an appropriate temperature control of approved type (not shown) and a motor 27, with current conducting wires 28 leading from the refrigeration unit 26 for connection with a primary source of electrical energy for operating the refrigeration unit 26. Additional current conducting wires 29 extend from the appropriate points selected within the insulated refrigeration structure for illuminating the interior thereof, to the exterior thereof for connection with a primary source of electrical energy in any appropriate and well known manner.

As shown clearly in Figures 1 and 2, the protecting pan 13 may be firmly fastened to the ceiling 15, by suitable fastening members 30, with the protecting pan 13 extended through an opening 31 in the upper portion of one or more transverse vertical partitions 32 in the insulated refrigeration structure 12, while a series of air openings 33 are provided in the lower portion of the partition or partitions 32 to form communication between the compartments 34 and 35 formed by the partition or partitions 32, and thus permit free air circulation through all of these partitions while the insulated refrigerator structure is in use. It is also apparent that the protecting pan 13 is automatically drained of liquid caused by condensation therein, by way of the drain pipe 36 depending from the central portion thereof and terminating in an open end below the bottom 12a of the insulated refrigeration structure 12, as shown, or otherwise definitely discharging such liquid.

Compartments 34 and 35 in the type of insulated refrigeration structure 12, and all such compartments, are especially adapted for containing and preserving therein meats, fruits, foods, poultry, eggs, other perishables or non-perishables and each of these compartments 34 and 35 is provided with a separate insulated, air-tight door 34a or 35a which securely locks and seals, when closed and can only be opened by an authorized party, thereby protecting the contents of the compartments 34 and 35 against improper changes in air temperatures, air circulation, or entry of atmospheric or impure air, dust and the like, during transportation or storage within the insulated refrigeration structure 12. This type of insulated refrigeration structure 12 includes, in its forward rounded end 37, one or more lower compartments 38 and an upper compartment 39 and it is in this upper compartment 39 that the refrigeration unit 26 is located, and also the blower fan 21. A small casing, 40, within the upper compartment 39, encloses the blower fan 21 and its motor 22 and opens only into the compartment 35, by way of the small opening 41 in the front end wall 35b of the compartment 35 through which the air pipe 20 extends for connection with the funnel shaped end 19 of the protecting pan 13, as previously described. Appropriate doors 38a and 39a are provided for the compartments 38 and 39, respectively to permit access to these compartments, as may be required and when closed and sealed will prevent unauthorized entry to such compartments.

From the foregoing detailed description taken in connection with the drawings, it will be readily apparent that the air within the refrigeration compartments 34 and 35 will constantly have a tendency to rise to the top or ceiling thereof and, operation of the blower fan 21 will drive the air over the refrigeration coils 11, within the protecting pan 13, cooling the air and driving it out of the protecting pan 13 by way of the slots 16 of the latter and thus distributing the cooled air and forcing it downwardly in all portions of the said refrigeration compartments 34 and 35. This continued process results in a steady circulation of the air and maintains the air at a constant and even temperature, throughout all parts or portions of the refrigeration compartments 34 and 35, as long as may be desired, for the best results, simply by proper adjustment and regulation of the refrigeration unit 26.

The principle herein involved and the structure employed for putting it into operation, both may be employed in connection with various types of refrigeration structures, both stationary and portable or travelling and furthermore, may be altered as desired, within the scope of the terms of my claims, without departing from the spirit of the invention.

Having now fully described my invention, what I claim is:

1. A refrigeration structure including insulated product accommodating compartments; an insulated partition between said compartments with air openings through its lower portion; a slotted pan extended through the upper portion of said partition; refrigeration coils supported within said slotted pan; a refrigeration unit connected with said refrigeration coils; and means for blowing air currents over said refrigeration coils and out of said slotted pan for circulation through the air openings of the insulated partition and throughout all portions of said insulated product accommodating compartments.

2. A refrigeration structure including an insulated structure having product accommodating compartments therein; an insulated partition between said product accommodating compartments; said insulated partition having air openings through its lower portion; refrigeration coils suspended from and close to the ceiling of said product accommodating compartments; a protecting pan secured to the said ceiling and enclosing the said refrigeration coils; said protecting pan resting on said insulated partition and extending into each of said product accommodating compartments; said protecting pan having a funnel shaped end and slots in its sides; a drain pipe for said protecting pan opening to the exterior of the refrigeration structure for discharge; a refrigeration unit connecting with both ends of said refrigeration coils; means connecting with the said funnel shaped end of the said protecting pan to force air currents over the said refrigeration coils, out of the slots of the said protecting pan and downwardly through all portions of the said products accommodating compartments and through the air holes of said insulated partition; operating means for the last mentioned means; and enclosing protecting means for the said last mentioned means and its operating means.

ISAAC J. CLARK.